United States Patent [19]

Maezawa

[11] 4,241,897
[45] Dec. 30, 1980

[54] BUTTERFLY VALVE

[75] Inventor: Keiji Maezawa, Tokyo, Japan

[73] Assignee: Maezawa Kasei Kogyo Kabushiki Kaisha, Tokyo, Japan

[21] Appl. No.: 967,686

[22] Filed: Dec. 8, 1978

[30] Foreign Application Priority Data

Dec. 17, 1977 [JP] Japan .................. 52-169746[U]

[51] Int. Cl.³ .................. F16K 31/50; F16K 31/528
[52] U.S. Cl. .................. 251/229; 74/424.8 VA; 251/252; 251/269; 251/306
[58] Field of Search .......... 251/252, 266, 267, 268, 251/269, 274, 229, 368, 306; 248/49; 285/61, 321; 74/424.8 VA

[56] References Cited

U.S. PATENT DOCUMENTS

| 1,403,056 | 1/1922 | Noble | 251/252 |
| 1,858,101 | 5/1932 | McAfee | 248/49 |
| 2,179,165 | 11/1939 | Sifkovitz | 251/252 |
| 2,738,684 | 3/1956 | Shafer | 251/267 |
| 2,883,144 | 4/1959 | Kendig | 251/58 |
| 2,896,887 | 7/1959 | Beltz | 248/49 |
| 3,319,925 | 5/1967 | Kojima et al. | 251/252 |
| 3,396,938 | 8/1968 | Matsui | 251/266 |
| 3,417,960 | 12/1968 | Stehlin | 251/58 |
| 3,606,801 | 9/1971 | Williams | 74/424.8 VA |
| 3,667,785 | 6/1972 | Kapeker | 285/321 |

FOREIGN PATENT DOCUMENTS

| 2330920 | 9/1975 | Fed. Rep. of Germany | 251/368 |
| 616798 | 2/1961 | Italy | 251/267 |

Primary Examiner—Martin P. Schwadron
Assistant Examiner—G. L. Walton
Attorney, Agent, or Firm—James E. Nilles

[57] ABSTRACT

A butterfly valve made of a synthetic resin comprising; a valve casing, a valve plate, a valve shaft connected to said valve plate, pivoted turnably to said valve casing and having one end thereof protruding into an axial cylinder formed to protrude from said valve casing, and a rotary moving member engaged with the outer circumference of said valve shaft turnably and slidably in the axial direction, retarding the rotation of an operation handle shaft and transmitting it to said valve shaft.

2 Claims, 3 Drawing Figures

BUTTERFLY VALVE

This invention relates to a butterfly valve to be used for water pipes laid down underground.

Most of conventional butterfly valves used for the water supply and the like are made of cast iron. In executing the piping arrangement between the cast iron butterfly valve and plastic pipes, the cast iron butterfly valve is first incorporated in a valve casing made of a cast iron and then connected to the plastic pipes. However, since the valve casing is heavy in weight, the plastic pipes tend to cause cracks after the work and thus result in leadage. From time to time a worm reduction gear is used in order to retard the switching speed of the valve. In this case, the valve casing must be large in size and hence, in weight, thereby making it difficult to execute the work.

To reduce the weight of the valve casing, the valve casing made of a synthetic resin is sometimes employed in combination with a butterfly valve made likewise of a synthetic resin. In such a device, flanges are formed at both open ends of the synthetic resin valve casing and connected by means of bolts to mating flanges of mouthpieces for coupling the water pipes to thereby establish the connection between the valve casing and the mouthpieces. Similarly, the mouthpieces are brought under flange connection with the water pipes. However, cracks tend to occur at the flanges because the flanges must be fastened firmly in order to prevent leakage. In addition, flange connection itself is a time- and labour-consuming work.

The present invention is directed to obtain a butterfly valve free from the abovementioned problems. In the butterfly valve in accordance with the present invention, the weight of the valve casing portion is reduced by incorporating a butterfly-type valve plate made of a synthetic resin in a valve casing made of a synthetic resin and hollow cylindrical mouthpieces made of a synthetic resin are integrally formed at both ends of said valve casing made of a synthetic resin. This arrangement eliminates the troublesome procedures required in the conventional butterfly valve which involve the steps of putting the mouthpieces to both ends of the valve casing and then fastening several positions of these flange portions by means of bolts, and thus prevents damages of the flanges arising from the flange-fastening as well as the possible leakage from the joint sections between the valve casing and the mouthpieces.

In the butterfly valve of the present invention, rubber rings are fitted to the water pipe connecting section of the mouthpieces to facilitate the connection of the water pipes. The rubber rings cause elastic deformation when the axis of the mouthpieces somehow deviates from that of the water pipes and thus prevent troubles that might otherwise occur. Furthermore, as the butterfly valve of the present invention is to be used for the underground piping arrangement, the valve casing in the present invention is supported stably by means of support plates for supporting the valve casing.

Other objects and features of the device of the present invention will become more apparent from the following detailed description to be read in conjunction with the accompanying drawings.

Figure 1:
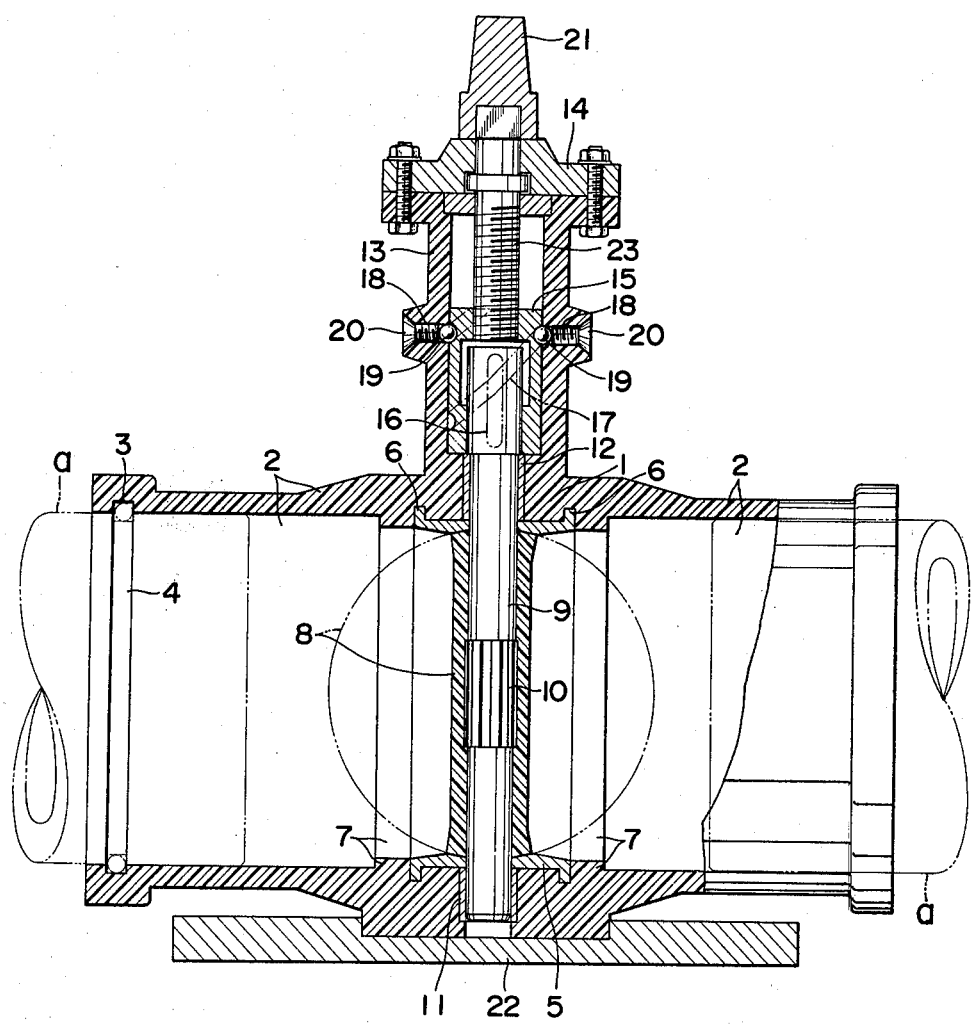
FIG. 1 is a longitudinally sectional side view showing an embodiment of the valve in accordance with the present invention.

In FIG. 1 reference numeral 1 represents a hollow cylindrical valve casing made of a synthetic resin and hollow cylindrical mouthpieces 2, 2 made of a synthetic resin are either formed integrally with, or bonded to, the valve casing 1. Rubber rings 4, 4 are fitted into annular grooves 3, 3 formed on the inner circumference in the proximity of the outer ends of the mouthpieces 2, 2, respectively.

The lower bottom portion of the valve casing 1 is supported by a support plate 22 that extends below the mouthpieces 2, 2. An annular valve seat 5 made of an elastic material is fitted onto the inner circumferential wall of the valve casing 1 and its edges at both ends are bent outwardly and fitted into the inner circumferential wall of the valve casing 1. The edges at both ends of the valve seat 5 are supported on their outer edge surfaces by annular stepped portions 7, 7 that are defined at the inner edges of the mouthpieces 2, 2, respectively. A swelling portion is formed on a disc-like valve plate 8 made of a synthetic resin and fitted to the valve seat 5 and extends in the direction of diameter.

A valve shaft 9 is inserted into this swelling portion of the valve plate 8 engages with a knurled groove 10 formed around the outer circumference of the valve shaft 9 and is secured thereto. The lower end of the valve shaft 9 is supported by the lower bottom portion of the valve casing 1 via a bearing 11 and its intermediate portion is supported by the upper wall of the valve casing 1 via a bearing 12. The upper end of the valve shaft 9 penetrates through the upper wall of the valve casing 1 and extends to protrude into an axial cylinder 13 that is formed integrally with, and protrudes above, the valve casing 1. The valve shaft 9 is further inserted into a hollow cylindrical rotary moving member 15 capable of moving up and down inside the axial cylinder 13 and is allowed to mate with a key groove 16 formed on the inner circumferential wall of the moving member 15 and extending in the axial direction by means of a key (not shown).

A bolt 23 is brought into screw engagement with the upper portion of the moving member 15 and its upper end protrudes upward beyond a lid 14 at the upper end of the axial cylinder 13 and is interconnected to a rotary handle shaft 21. Screw slots 17 having a pitch greater than that of the screw of the abovementioned bolt 23 is cut on the outer circumference of the moving member 15 in such a manner that the lead angle of the screw slot 17 becomes great as represented by $\alpha_1$ in FIG. 2 when the opening of the valve plate 8 rotates in the range of from 0 to about 20 degrees and becomes small as represented by $\alpha_2$ in the range of from 20 to 90 degrees. It goes without special noting in this instance that the lead angle $\alpha_2$ is greater than that of the bolt 23. Balls 19, 19 are fitted into the screw slots 17 of the moving member 15 from through-holes 18, 18 that are formed respectively to penetrate through the circumferential wall of the axial cylinder 13. Set screws 20, 20 are screwed into the through-holes 18, 18 so as to bring these balls 19, 19 into pressing contact with the screw slots 17.

The explanation will now be given on the action of this embodiment of the butterfly valve in accordance with the present invention.

Water pipes a, a made of a synthetic resin are connected to the right and left mouthpieces 2, 2 via the rubber rings 4, 4 respectively and laid down underground, while the valve casing 1 is laid down as it is supported onto the support plates 22, 22.

When the handle shaft 21 is turned, the bolt 23 directly connected to the handle shaft 21 is also turned so that the moving member 15 screwed to this bolt 23 moves up and down while rotating. Since the pitch on the outer circumference of the moving member 15 is greater than that of the screw of the bolt 23, however, the moving member 15 is guided by the screw slots 17 and the ball 19 fitted thereto and rotates at a speed slower than that of the bolt 23. For example, then the bolt 23 turns 8 rounds, the valve shaft 9 does ¼ rounds, thereby preventing the water hammer phenomenon. Smooth rotation is ensured for the moving member 15 by the roller action of the ball 19. At this time the valve shaft 9 engaged with the moving member 15 by the key rotates in response to the rotation of the moving member 15 without causing the movement in the vertical direction whereby the valve plate 8 causes the opening or closing action.

Rotation of the bolt 23 having a small pitch is transmitted to the moving member 15 having a large pitch such as ¼-turn of the valve shaft 9 in response to 8-turn of the bolt 23, for example, so that rotation of the moving member 15 turns the valve shaft 9. Because of this arrangement, when the valve plate 8 is stopped at the intermediate position between the full admission and full shut-off positions, the frictional resistance of the bolt 23 having a large pitch prevents the reverse rotation of the valve plate 8 and the valve shaft 9 due to the water flow. It is therefore possible to adjust the flow rate while setting the opening of the valve plate 8 to the intermediate position.

Figure 2:
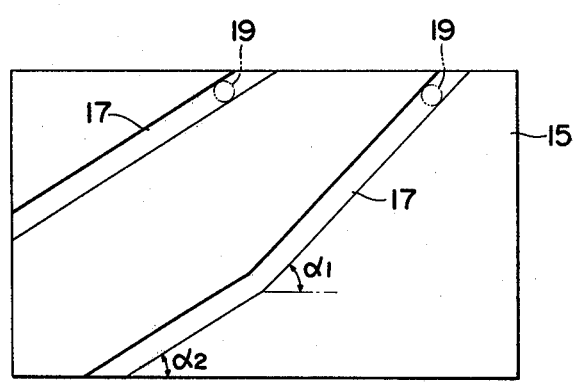
FIG. 2 is an exploded view of its inner cylinder.
Figure 3:
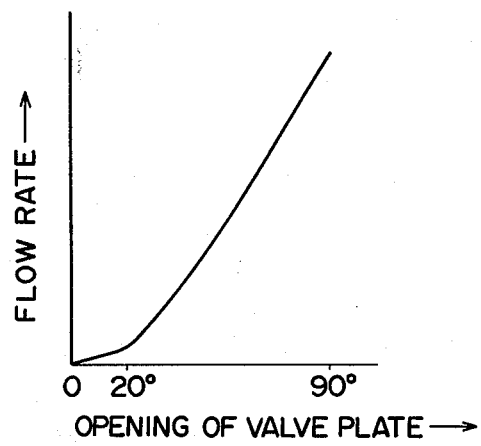
FIG. 3 is a diagram showing the relationship between the flow rate and the opening of a valve plate when the valve of the present invention is employed.

Since the lead angles $\alpha_1$ and $\alpha_2$ of the screw slot 17 of the moving member 15 satisfies the relation $\alpha_1 > \alpha_2$ as shown in FIG. 2, the valve plate 8 opens gradually from 0 to 20 degrees as shown in FIG. 3 because the lead angle $\alpha_1$ is large, and opens rapidly from 20 to 90 degrees till it reaches the full admission indicated by chain line in FIG. 1 because it is guided by the screw slot 17 having the lead angle $\alpha_2$ smaller than the lead angle $\alpha_1$. When the valve plate 8 opens to about 20 degrees, the lefthand ball 19 in FIG. 2 engages with the upper screw slot 17 in FIG. 2 and rotates from 20 to 90 degrees while being guided by the mutually parallel screw slots 17 and 17. When the valve plate 8 is closed, its speed of rotation is fast from 90 to 20 degrees and is slow from 20 to 0 degree as the valve plate is guided by the screw slots 17 and the balls, thereby preventing the water hammer phenomenon.

As described in the foregoing paragraph, since the synthetic resin butterfly valve is incorporated in the synthetic valve casing in the present invention, the weight is not particularly excessively applied to the valve casing portion when the device of the present invention is connected to the plastic pipe in comparison with the conventional butterfly valve made of cast iron. Hence, the present device is free from the problem of crack of the plastic material.

Since the valve shaft is not directly connected to the operation handle shaft but the intermediate moving member is disposed so as to reduce the rotation of the handle shaft and transmit it to the valve shaft, it is possible in the present invention to retard the opening or closing speed of the valve plate, to prevent the water hammer phenomenon and to prevent damage of the valve plate.

In the present invention, the synthetic mouthpieces are integrally formed at both open ends of the synthetic valve casing. In comparison with the conventional device wherein the mouthpieces are separately formed from the valve casing and are connected mutually by means of flanges, the device of the present invention eliminates the time and labor required for the interconnection and needs not any specific consideration for possible damages arising from the interconnection using the flanges. In addition, no leakage occurs at the joint sections between the valve casing and the mouthpieces. Since the device of the present invention has the construction wherein the hollow cylindrical valve casing is connected to the hollow cylindrical mouthpieces in the axial direction, it can be easily molded from the synthetic resin. Furthermore, as the rubber rings are respectively fitted to the outer end portion of the mouthpieces, the water pipe to be connected to each mouthpiece can be easily fitted and connected to the mouthpiece without such labours as required in the case of flange coupling. Together with elimination of the abovementioned coupling means, this facilitates the on-the-site work. When the water pipe is laid down underground, the pressure of soil prevents the pipe from taking off from the valve.

Deviation of axis between the valve casing and the water pipes due to the soil pressure and the like, if any, and oscillation due to the water hammer can be absorbed by the elastic deformation of the rubber rings, thereby enabling to prevent damages of the synthetic resin valve casing and water pipe. Furthermore, since the valve casing as well as the mouthpieces are made of the synthetic resin, they can be easily mass-produced by integral molding. As they are light in weight and have corrosion resistance as high as a water pipe made of rigid vinyl chloride that has gained wide application in recent years, they are advantageous for the piping arrangement. Since the valve casing is supported onto the support plates, the device of the present invention is free from the problem that only the valve casing portion is pushed into the soil during the opening and closing actions or at other times. Hence, the joint sections between the valve casing and the water pipes can be supported stably.

What is claimed is:

1. A butterfly valve particularly suitable for connection with synthetic resin pipes and for underground installations, said butterfly valve being characterized by:
    A. a body of synthetic plastic having
        (1) a main portion defining
            (a) a central annular valve casing and
            (b) a pair of tubular mouthpieces that are coaxial with said valve casing and project in opposite axial directions therefrom, and
        (2) a cylindrical chamber portion projecting laterally from said valve casing at one side thereof, said chamber portion having its axis normal to that of said main portion;
    B. a metal driven shaft extending diametrally across said valve casing coaxially with said chamber portion and having an end portion projecting into said chamber portion, said driven shaft being rotatably journaled in coaxial bearings in the wall of said valve casing;
    C. a cylindrical actuating member axially slidably and rotatably confined in said chamber portion, said actuating member (1) having a helix connection with said chamber portion whereby axial motion of said actuating member is accompanied by rotation thereof, and (2) surrounding said end portion of the driven shaft and having a splined connection therewith whereby the actuating member is axially movable relative to said shaft but said shaft is constrained to rotate with the actuating member;

D. a drive shaft journaled in an outer portion of said chamber, said drive shaft (1) being coaxial with the driven shaft, (2) being confined to rotation relative to said body, (3) having an outer end portion that is accessible at the exterior of said chamber for rotational actuation and (4) having an inner end portion in said chamber that is surrounded by said actuating member and has a threaded connection therewith whereby rotation of the drive shaft imparts axial motion to the actuating member; and E. a disc-like valve element secured to said driven shaft to be turned flatwise between open and closed positions by rotation of the driven shaft.

2. The butterfly valve of claim 1, further characterized by:

F. an annular elastic valve seat coaxially confined in said valve casing to cooperate with said valve disc.

* * * * *